(12) United States Patent
Shigenaga et al.

(10) Patent No.: US 7,015,923 B2
(45) Date of Patent: Mar. 21, 2006

(54) APPARATUS FOR PAINTING FIGURE

(75) Inventors: Satoshi Shigenaga, Nagaokakyo (JP); Tomohiro Okada, Yao (JP); Tadashi Okamoto, Kouchi (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 175 days.

(21) Appl. No.: 09/951,399

(22) Filed: Sep. 14, 2001

(65) Prior Publication Data

US 2002/0039102 A1    Apr. 4, 2002

(30) Foreign Application Priority Data

Sep. 29, 2000 (JP) .............................. 2000-297755

(51) Int. Cl.
*G09G 5/00* (2006.01)
(52) U.S. Cl. .................. 345/582; 345/543; 345/502; 345/419
(58) Field of Classification Search ................ 345/582, 345/502, 419, 441, 543, 501
See application file for complete search history.

(56) References Cited

U.S. PATENT DOCUMENTS

| 5,274,760 | A |   | 12/1993 | Schneider | 395/162 |
| 5,355,451 | A | * | 10/1994 | Nonaka | 345/530 |
| 5,623,608 | A | * | 4/1997 | Ng | 711/137 |
| 5,852,447 | A | * | 12/1998 | Hosoya et al. | 345/468 |
| 5,872,574 | A | * | 2/1999 | Hara et al. | 345/441 |
| 5,940,091 | A | * | 8/1999 | Nakamura | 345/543 |
| 6,052,125 | A |   | 4/2000 | Gardiner et al. | 345/421 |
| 6,088,033 | A | * | 7/2000 | Pajarre | 345/419 |
| 6,141,020 | A | * | 10/2000 | Larson | 345/501 |
| 6,154,225 | A |   | 11/2000 | Kou et al. | 345/519 |
| 6,393,520 | B1 | * | 5/2002 | Yoshikawa et al. | 711/119 |
| 6,518,965 | B1 | * | 2/2003 | Dye et al. | 345/419 |

FOREIGN PATENT DOCUMENTS

| JP | 01239584 A | 9/1989 |
| JP | 05342308 A | 12/1993 |
| JP | 06012497 A | 1/1994 |
| JP | 08051586 A | 2/1996 |

* cited by examiner

*Primary Examiner*—Michael Razavi
*Assistant Examiner*—Jin-Cheng Wang
(74) *Attorney, Agent, or Firm*—Steptoe & Johnson LLP

(57) ABSTRACT

To provide an apparatus for painting figures which is improved in painting capability better than the conventional art even when a path to an external memory section is narrow. In order to simultaneously write previously generated painting information and read data required for generating painting information later in the painting coordinate generating section and the painting information generating section on the painting apparatus, while painting information is generated, first and second buffers are provided as a buffer section for storing painting information generated in the painting information generating section, and address information storing sections corresponding to the first and second buffers are provided as an address generating section for generating an address for storing painting information, which is accumulated in the buffer section, in an external memory section. When reading and writing is carried out on the first buffer, the following operations are performed in parallel: outputting data, which is previously written to the second buffer, to the external memory section, reading data required for the next processing from the external memory section.

5 Claims, 15 Drawing Sheets

FIG. 10A
FIG. 10B
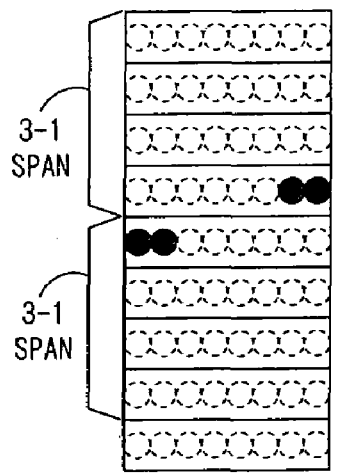
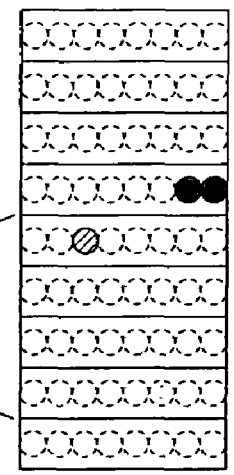
ERROR →
FIG. 10C
CORRECT
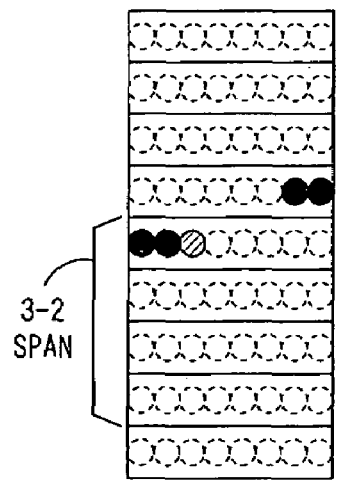

… (1)

APPARATUS FOR PAINTING FIGURE

FIELD OF THE INVENTION

The present invention relates to an apparatus for painting figures that performs a painting processing in the field of computer graphics.

BACKGROUND OF THE INVENTION

An apparatus for painting figures performs processing such as filling a specific region and drawing line segments in a specific section.

Such an apparatus is configured as shown in FIG. 12.

The apparatus is constituted by a painting coordinate generating section 10, which successively generates x and y coordinates at the left and right ends when filling a region and successively generates x and y coordinates at the coordinate points when drawing line segments, a painting information generating section 20 for generating painting information in response to the painting coordinate generating section 10, a buffer section 30 for temporarily storing data from the painting information generating section 20, and an address generating section 60 for generating an address for storing in a memory section 70 painting information accumulated in the buffer section 30. The memory section 70 is disposed outside the painting apparatus.

In such an apparatus, the following processing makes it possible to accumulate painting information in the memory section 70. The painting information is generated in three-dimensional processing while referring to a Z value.

FIG. 13 shows the progress of painting processing in the painting apparatus. FIG. 14 shows processing timings.

In step [S500], a Z value is loaded. The following will discuss a case of filling a triangle having an x coordinate, a y coordinate, and a Z value (depth coordinate) of (26, 7, 1), (32, 1, 1), (38, 7, 13) at the vertexes. The painting coordinate generating section 10 receives coordinate values of the triangle and a filling instruction from a painting instruction setting section (not shown). The painting coordinate generating section 10 generates an x coordinate and a y coordinate that conform to left and right ends of a filled region surrounded by triangle sides, and a corresponding Z value for each y coordinate from the vertex at the high end to the vertex at the low end of the triangle on display. The left end is computed by obtaining inclination of two vertexes of (26, 7, 1), (32, 1, 1). The right end is computed by obtaining inclination of two vertexes of (32, 1, 1), (38, 7, 13). On a first span at the high end of FIG. 13, the left and right ends conform to each other, and an x coordinate of 32, a y coordinate of 2, and a Z value of 1 are generated. Next, on a second span at the lower end, an x coordinate of 31, a y coordinate of 2, and a Z value of 1 are generated on the left end, and an x coordinate of 33, a y coordinate of 2, and a Z value of 3 are generated on the right end. A Z value between the left and right ends is computed by inclination obtained by a difference between the left and right ends. The address generating section 60 generates addresses for reading Z values corresponding to the region from the external memory section 70 and stores the addresses in the buffer section 30.

In step [S501], painting information is generated. For example, in the case of filling, a filling color is generated. In the painting information generating section 20, comparison is made between a Z value obtained from the painting coordinate generating section 10 and a Z value stored in the buffer section 30. When the newly generated Z value is on the viewpoint side, painting information is generated and is stored in the buffer section 30 as new painting information.

In step [S502], a Z value and frame memory (FM) are stored. In address generating section 60, the generated painting information in the buffer section 30 is stored in the memory section 70. This step completes the filling of a single span.

And then, the steps [S500] to [S502] are repeated on the second span and later until the last y coordinate.

However, such a conventional painting apparatus has the following problems.

As shown in FIG. 14, in order to perform a painting operation, a Z value for front-rear judgement is firstly read from the memory section 70, which is disposed outside the painting apparatus. Next, after reading, the painting information generating section 20 performs front-rear judgement for each pixel of a span, generates painting information, and stores the information in the buffer section 30. Finally, the generated painting information is written from the buffer section 30 to the memory section 70.

In case of performing the above processing, as shown in FIG. 14, access to the memory section 70 is not provided when painting information is generated, considering utilizing efficiency of a path to the memory section 70 disposed outside the painting apparatus. A path from the painting apparatus to the external memory section 70 is generally narrow. Thus, reduction in processing capability of the painting apparatus is disadvantageous in view of progress of a semiconductor.

The present invention is devised to solve the above conventional problem. The object is to provide a painting apparatus which improves painting capability better than the conventional art even when a path from the painting apparatus to the external memory section 70 is narrow.

DISCLOSURE OF THE INVENTION

An apparatus for painting figures of the present invention is characterized in that a buffer section includes a plurality of buffers such as two buffers, an address generating section includes address information storing sections corresponding to the respective buffers, when a coordinate generating section and a painting information generating section perform reading and writing on one of the buffers, data previously written to one of the other buffers is outputted to a memory section, and data required for the next processing is read from the memory section.

According to the above configuration, in the painting coordinate generating section and the painting information generating section on the painting apparatus, while painting information is generated, the following operations are performed in parallel: writing previously generated painting information, reading in advance data required for generating painting information later, and generating painting information. Thus, in general, it is possible to increase utilizing efficiency of a bus making connection with a low-speed external memory and improve a painting speed, thereby achieving painting capability better than ever without the necessity for a plurality of painting sections.

The embodiments of the apparatus for painting figures will be further discussed according to the present invention.

The apparatus for painting figures of the present invention is provided with the painting coordinate generating section for generating a painting coordinate in painting processing, the painting information generating section for generating painting information for a region generated from the painting coordinate generating section, the buffer section for storing painting information generated in the painting information generating section, and an address generating section for generating an address for storing painting information, which is accumulated in the buffer section, in the external memory section. The buffer section includes a plurality of buffers and the address generating section includes address information storing sections corresponding to the plurality of buffers of the buffer section. When the painting coordinate generating section and the painting information generating section perform reading and writing on one of the buffers, the following operations are performed in parallel: outputting data previously written to one of the other buffers to the external memory section, and reading data required for the next processing from the external memory section.

Further, the apparatus for painting figures of the present invention is characterized in that the buffer section includes two buffers, the address generating section includes address information storing sections corresponding to the two buffers of the buffer section, and when the painting coordinate generating section and the painting information generating section perform reading and writing on one of the buffers, the following operations are performed in parallel: outputting data previously written to the other buffer to the external memory section, and reading data required for the next processing from the external memory section.

Moreover, the apparatus for painting figures of the present invention is characterized in that comparison is made in the address generating section between a capacity and a filling amount of each buffer, and an address dividing section is provided for dividing a filling operation for the memory section when the filling amount exceeds the capacity of each buffer.

Also, the apparatus for painting figures of the present invention is characterized in that in a dividing operation performed by the address dividing sections, when the address generating section, the painting information generating section, and the buffer section generate painting information, a possible occurrence of data interference is judged by referring to the previous results upon division, and a data exchange line is provided for exchanging data between the buffers when data interference is judged to occur.

Besides, the apparatus for painting figures of the present invention is characterized in that the address dividing sections determine if data is in a same access to judge the occurrence of data interference, in the case of painting line segments.

Further, the apparatus for painting figures of the present invention is characterized in that the address dividing sections determine if previously rewritten data is in a same access to judge the occurrence of data interference in the case of filling processing.

BRIEF DESCRIPTION OF THE DRAWINGS

FIGS. 10A, 10B, 10C, and 10D are explanatory drawings showing a filling operation of Embodiment 3;

DESCRIPTION OF THE EMBODIMENT(S)

Referring to FIGS. 1 to 11, the following will describe embodiments of the present invention.

(Embodiment 1)

Figure 1:
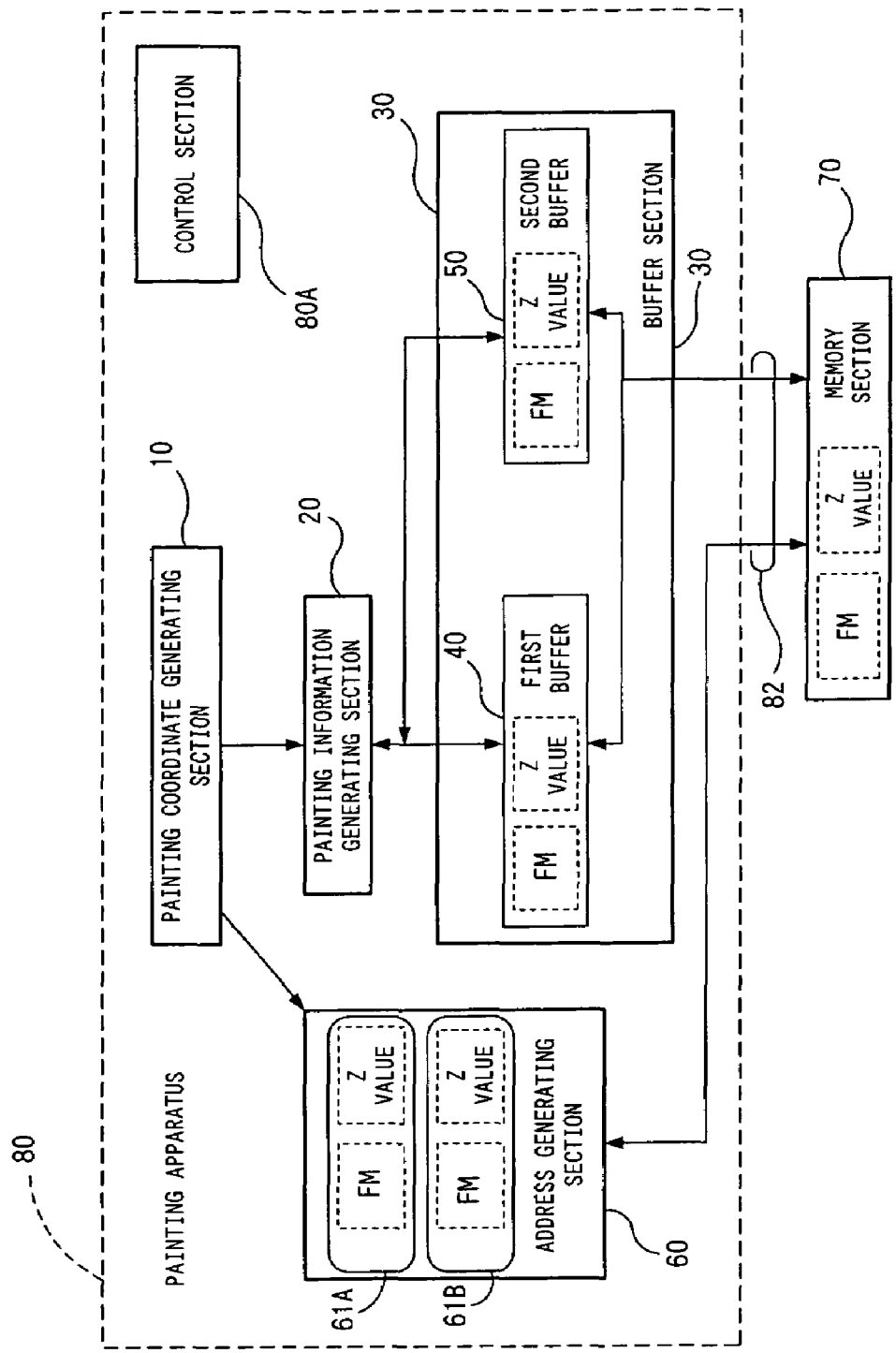
FIG. 1 is a structural diagram showing an apparatus for painting figures according to Embodiment 1 of the present invention.
Figure 2B:
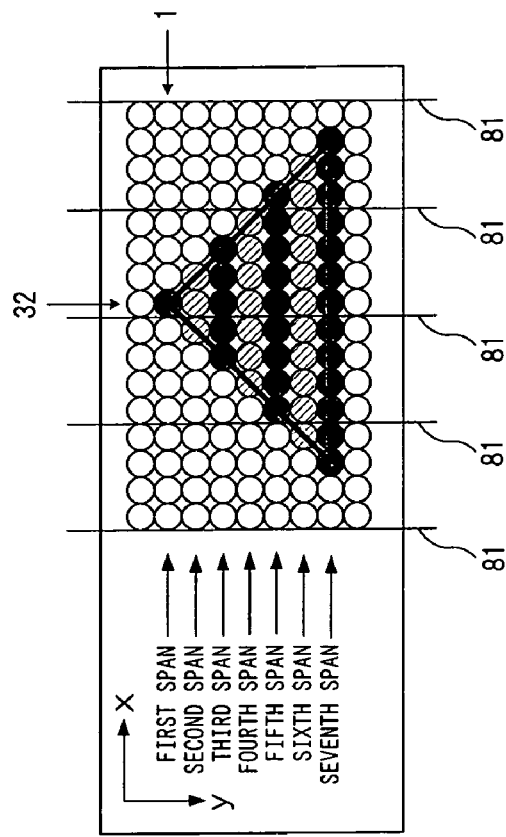
FIGS. 2A and 2B are explanatory drawings showing a painting operation of Embodiment 1.
Figure 2A:
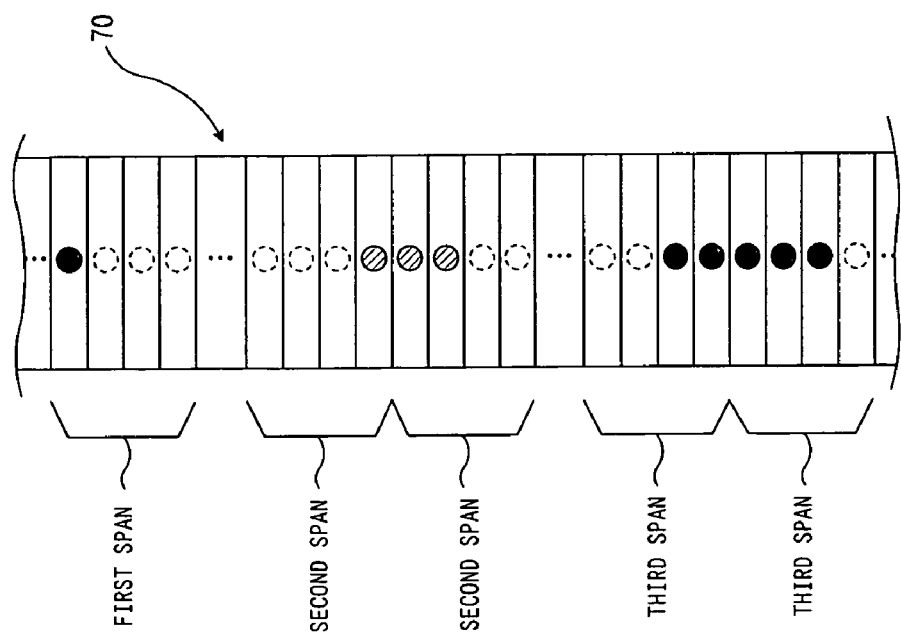
Figure 3:
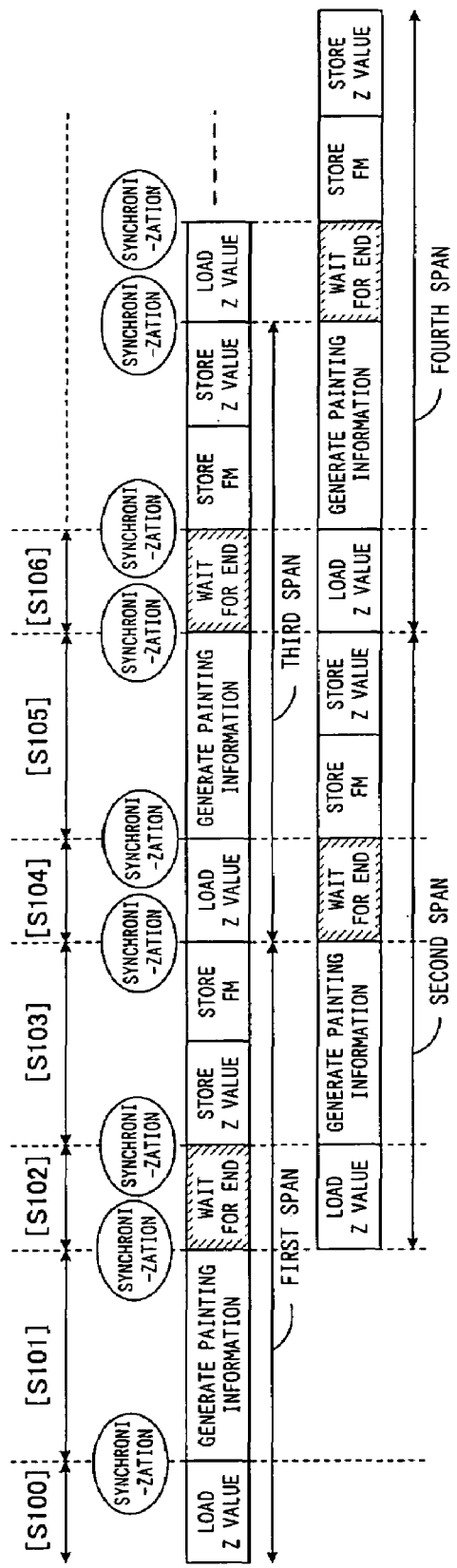
FIG. 3 is a diagram showing operating timings of Embodiment 1.

FIGS. 1 to 3 show Embodiment 1 of the present invention.

FIG. 1 shows a painting apparatus of the present invention.

In a painting apparatus 80, reference numeral 10 denotes a painting coordinate generating section for generating painting coordinates indicative of a region to be painted. Reference numeral 20 denotes a painting information generating section for generating painting information of a region generated in the painting coordinate generating section 10. Reference numeral 30 denotes a buffer section for storing painting information generated in the painting information generating section 20. The buffer section 30 includes first and second buffers 40 and 50 for temporarily storing all of span direction painting information at one time. Reference numeral 60 denotes an address generating section which generates an address for specifying a painted region for the memory section 70 (e.g., RAM). The memory section 70 receives coordinates from the painting coordinate generating section 10 and stores a painted region. Reference numeral 80A denotes a control section for controlling the above sections to perform desired painting processing.

Besides, the address generating section 60 includes an address information storing section 61A corresponding to the first buffer 40 of the buffer section 30 and an address information storing section 61B corresponding to the second buffer 50 of the buffer section 30.

FIGS. 2A and 2B show an example of a painting operation. FIG. 2A is a memory map showing the stored content of the memory section 70. FIG. 2B is an explanatory drawing showing a painting screen, in which each circle indicates a single pixel. Further, vertical lines 81 of FIG. 2B indicate word boundaries.

FIG. 3 shows operating timings of the control section 80A shown in FIG. 1.

Here, the memory section 70 and the buffer section 30 are connected to each other via a bus having a width of 32 bits. The following will describe a filling operation as an example in which color information stored in frame memory refers to a Z value (8 bits/pixel) of a triangle of 8 bits/pixel.

In step [S100], a Z value of the first span is loaded. The painting coordinate generating section 10 generates an x coordinate and a y coordinate that conform to the left and right ends of the filling in the first span, and a Z value (depth coordinate) corresponding to the coordinates.

For example, FIG. 2B shows that the left end of an x coordinate is 32, the right end of an x coordinate is 32, and a y coordinate is 1. Further, the address generating section 60 generates an address for reading a Z value corresponding to the region from the external memory section 70, and stores the read Z value in the first buffer 40 of the buffer section 30. Moreover, the address information at this moment is stored in the address information storing section 61A of the address generating section 60 to write painting information in the memory section 70.

In step [S101], painting information of the first span is generated. In the painting information generating section 20, a Z value obtained in the painting coordinate generating section 10 and a Z value stored in the first buffer 40 of the buffer section 30 are compared with each other. When a Z value newly generated from the painting coordinate generating section 10 is on the viewpoint side, painting information including the Z value and color information to the frame memory (FM) is generated, and the information is stored in the first buffer 40 of the buffer section 30 as new painting information.

For example, as shown in FIG. 2A, 8-bit color information and byte enable information, which allows only the rewriting of the 8-bit information, are generated in the control section 80A and are stored in the first buffer 40 so as to paint only a single pixel in 32 bits. Further, 8-bit information corresponding to a single pixel of a Z value in 32 bits and byte enable information, which allows only the rewriting of the 8-bit information, are generated in the control section 80A and are stored in the first buffer 40.

In step [S102], a Z value of the second span is loaded. The painting coordinate generating section 10 generates an x coordinate and a y coordinate that conform to the left and right ends of the filling of the second span, and a Z value (depth coordinate) corresponding to the coordinates.

For example, as shown in FIG. 2B, the left end of an x coordinate is 31, the right end of an x coordinate is 33, and a y coordinate is 2. Further, the address generating section 60 generates an address for reading a Z value corresponding to the region from the external memory section 70, and stores the read Z value in the second buffer 50 of the buffer section 30. Moreover, the address information at this moment is stored in the address information storing section 61B of the address generating section 60 to write painting information.

During this period, the painting information of the first buffer 40 waits for the end of loading a Z value of the second span while it is stored.

In step [S103], a Z value of the first span is stored, frame memory (FM) of the first span is stored, and painting information of the second span is generated.

In the painting information generating section 20, comparison is made between a Z value obtained in the painting coordinate generating section 10 and a Z value stored in the second buffer 50 of the buffer section 30. When a newly generated Z value is on the viewpoint side, painting information including a Z value and color information to the frame memory (FM) is generated, and the information is stored in the second buffer 50 of the buffer section 30 as new painting information.

For example, as shown in FIG. 2A, 3-pixel color information, the corresponding byte enable information, and byte enable information corresponding to a Z value of three pixels are stored in the second buffer 50 so as to paint only a single pixel in 32 bits and two pixels in 32 bits.

Additionally, the address generating section 60 generates an address for writing painting information of the first buffer 40 to the external memory section 70, based on address information of painting information previously stored in the first buffer 40, and the address generating section 60 writes painting information from the first buffer 40. Thus, the filling of the first span is completed.

Namely, a Z value of the first span is stored, frame memory (FM) of the first span is stored, and the painting information of the second span is generated in parallel. Hence, it is possible to improve efficiency of access to the memory section.

In step [S104], a Z value of the third span is loaded. The painting coordinate generating section 10 generates an x coordinate and a y coordinate that conform to the left and right ends of the filling of the third span, and a Z value (depth coordinate) corresponding to the coordinates.

For example, FIG. 2B shows that the left end of an x coordinate is section 30, the right end of an x coordinate is 34, and a y coordinate is 3.

Further, the address generating section 60 generates an address for reading a Z value corresponding to the region from the external memory section 70, and stores the read Z value in the first buffer 40 of the buffer section 30. Moreover, the address information at this moment is stored in the address information storing section 61A of the address generating section 60 to write painting information.

During this period, the painting information of the second buffer 50 waits for the end of loading a Z value of the third span while it is stored.

In step [S105], a Z value of the second span is stored, frame memory (FM) of the second span is stored, and painting information of the third span is generated.

In the painting information generating section 20, comparison is made between a Z value obtained in the painting coordinate generating section 10 and a Z value stored in the first buffer 40 of the buffer section 30. When a newly generated Z value is on the viewpoint side, painting information including a Z value and color information to the frame memory (FM) is generated, and the information is stored in the first buffer 40 of the buffer section 30 as new painting information.

Also, the address generating section 60 generates an address for writing painting information of the second buffer 50 to the external memory section 70, based on address information of painting information previously stored in the second buffer 50, and the address generating section 60 writes painting information from the second buffer 50. Thus, the filling of the second span is completed.

In step [S106], a Z value of the fourth span is loaded. The painting coordinate generating section 10 generates an x coordinate and a y coordinate that conform to the left and right ends of the filling of the fourth span, and a Z value (depth coordinate) corresponding to the coordinates.

For example, FIG. 2B shows that the left end of an x coordinate is 29, the right end of an x coordinate is 35, and a y coordinate is 4.

Further, the address generating section 60 generates an address for reading a Z value corresponding to the region from the external memory section 70, and stores the read Z value in the second buffer 50 of the buffer section 30. Moreover, the address information at this moment is stored in the address information storing section 61B of the address generating section 60 to write painting information.

During this period, the painting information of the first buffer 40 waits for the end of loading Z values of the fourth span while it is stored.

And then, steps [S103] to [S106] are repeated in the fifth span and later until the last y coordinate.

Therefore, as shown in FIG. 3, in steps [S103] to [S105], while painting information to be written to the external memory section 70 is generated for the painting coordinate generating section 10, the painting information generating section 20, and one of the buffers of the buffer section 30 that stores information in advance, an address of previously generated painting information is generated in the address generating section 60, and data is written from the other buffer to the external memory section 70. The following operations are performed in parallel: generating information in the painting apparatus, writing generated data from the painting apparatus, reading painting information required next time. Thus, it is possible to improve utilizing efficiency of the bus 82 connecting the memory section 70 and the buffer section 30, thereby increasing a painting speed.

(Embodiment 2)

Figure 4:
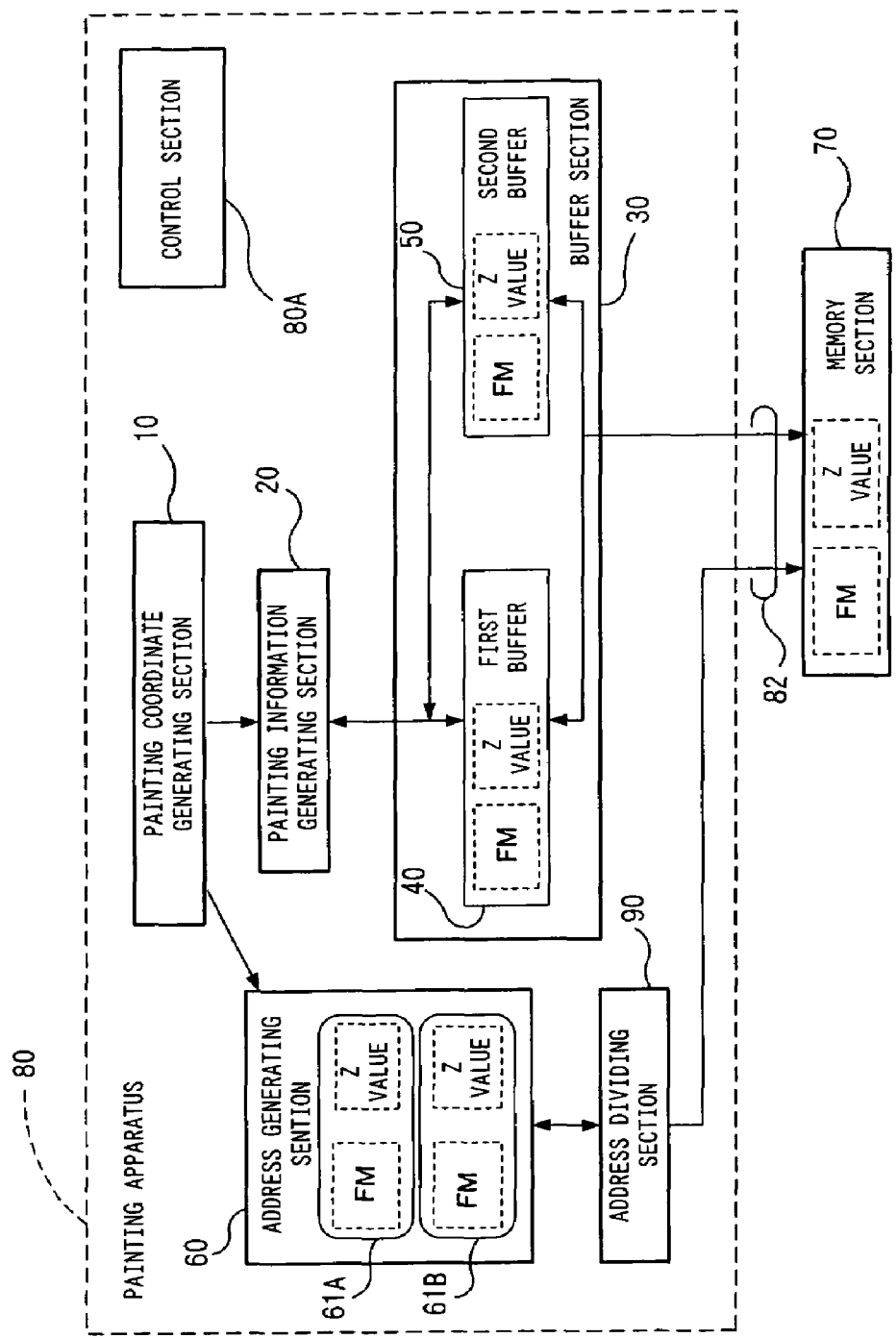
FIG. 4 is a structural diagram showing an apparatus for painting figures according to Embodiment 2 of the present invention.
Figure 5:
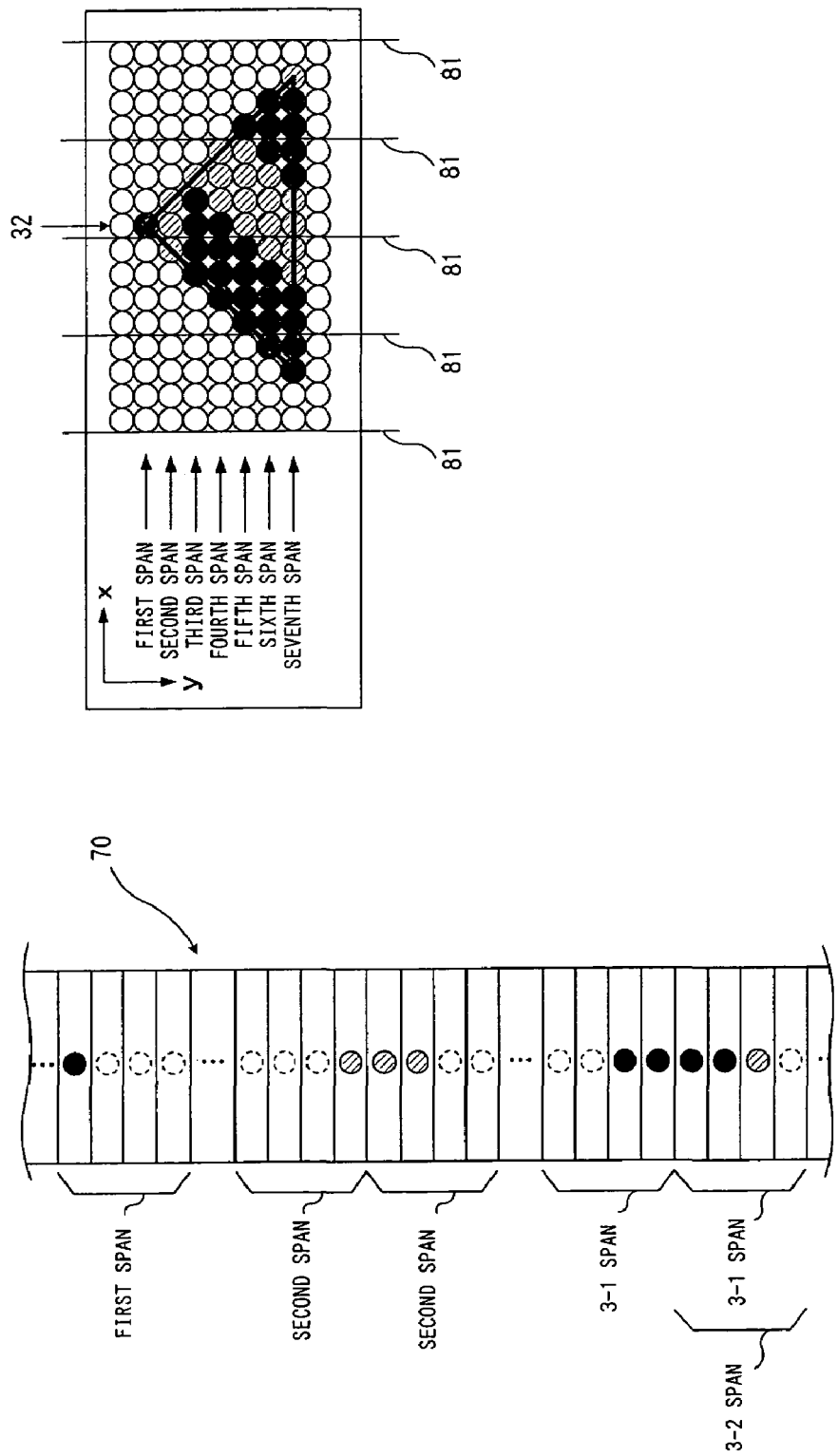
FIGS. 5A and 5B are explanatory drawings showing a painting operation of Embodiment 2.
Figure 6:
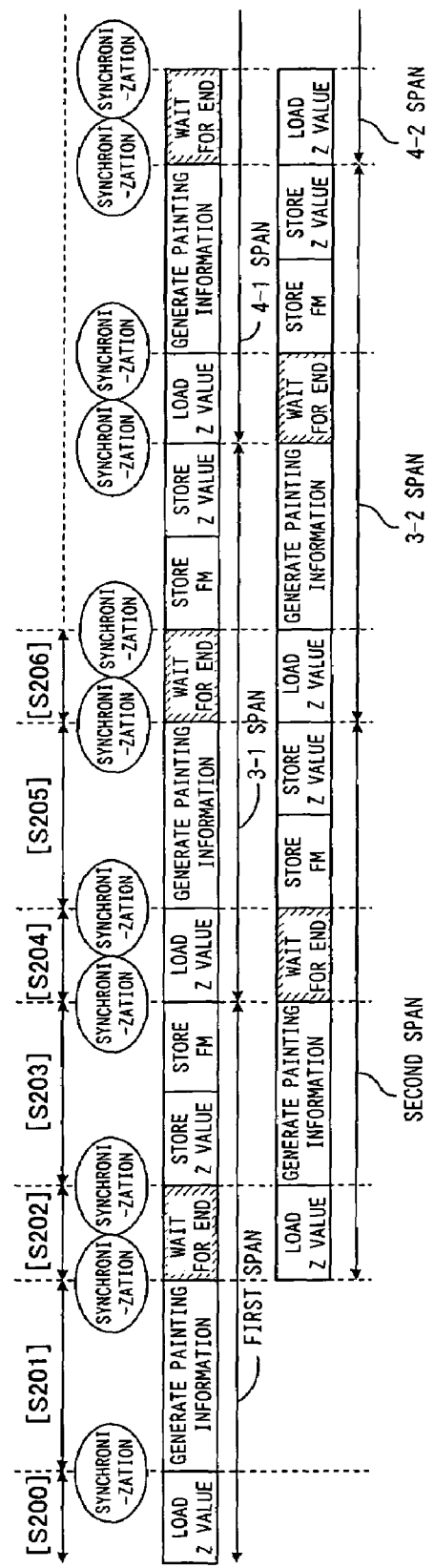
FIG. 6 is a diagram showing operating timings of Embodiment 2.

FIGS. 4 to 6 show Embodiment 2 of the present invention.

FIG. 4 shows a painting apparatus according to Embodiment 2 of the present invention. The members identical to those in FIG. 1 showing Embodiment 1 are indicated by the same reference numerals and the description thereof is omitted.

In a painting apparatus 80 of Embodiment 2, an address dividing section 90 is provided between an address generating section 60 and a memory section 70.

The address dividing section 90 divides an amount of loading and storing when an amount of data exceeds a single-time storable amount of a buffer section 30. To be specific, when painting information is temporarily stored in the buffer section 30, which is composed of buffers each having a constant capacity, an amount of data loaded and stored in the memory section 70 outside the painting apparatus 80 is limited to a fixed amount and painting of a single span is divided into a plurality of times in the address dividing section 90. The present embodiment is different from Embodiment 1 only in this point.

FIGS. 5A and 5B show an example of a painting operation. FIG. 5A is a memory map showing the memory content of the memory section 70. FIG. 5B is an explanatory drawing showing a painting screen, in which each circle indicates a single pixel. Further, vertical lines 81 of FIG. 5B indicate word boundaries.

FIG. 6 shows operating timings of the control section 80A shown in FIG. 4. The memory section 70 and the buffer section 30 are connected to each other via a bus having a width of 32 bits. The following will describe a filling operation in which color information stored in frame memory refers to a Z value (8 bits/pixel) of a triangle of 8 bits/pixel. Moreover, the capacities of the buffer sections are each four pixels in Embodiment 2.

In step [S200], a Z value of the first span is loaded.

The painting coordinate generating section 10 generates an x coordinate and a y coordinate that conform to the left and right ends of the filling of the first span, and a Z value (depth coordinate) corresponding to the coordinates.

For example, FIG. 5B shows that the left end of an x coordinate is 32, the right end of an x coordinate is 32, and a y coordinate is 1. The address generating section 60 generates an address for reading a Z value corresponding to the region from the external memory section 70. Additionally, since the number of pixels is one at this moment, the address dividing section 90 does not divide the address but requests data from the memory section 70 with the address, the memory section 70 transfers a Z value corresponding to the data, and the read Z value is stored in a first buffer 40 of the buffer section 30.

Further, address information at this moment is stored in the address generating section 60 to write painting information.

In step [S201], painting information of the first span is generated. In the painting information generating section 20, comparison is made between a Z value obtained in the painting coordinate generating section 10 and a Z value stored in the first buffer 40 of the buffer section 30. When a newly generated Z value is on the viewpoint side, painting information including the Z value and color information to the frame memory (FM) is generated, and the information is stored in the first buffer 40 of the buffer section 30 as new painting information.

For example, the first buffer 40 stores 8-bit color information, byte enable information corresponding to the 8-bit information, 8-bit information corresponding to a single pixel of a Z value in 32 bits, and byte enable information corresponding to the 8-bit information such that only a single pixel in 32 bits is painted.

In step [S202], a Z value of the second span is loaded. The painting coordinate generating section 10 generates an x coordinate and a y coordinate that conform to the left and right ends of the filling of the second span, and a Z value (depth coordinate) corresponding to the coordinates.

For example, FIG. 5B shows that the left end of an x coordinate is 31, the right end of an x coordinate is 33, and a y coordinate is 2. Further, the address generating section 60 generates an address for reading a Z value corresponding to the region from the external memory section 70. Additionally, since the number of pixels is three at this moment, the address dividing section 90 does not divide an address but requests data from the memory section 70 with the address, the memory section 70 transfers a Z value corresponding to the data, and the read Z value is stored in a second buffer 50 of the buffer section 30. Further, address information at this moment is stored in the address generating section 60 to write painting information.

During this period, the painting information of the first buffer 40 waits for the end of loading Z values of the second span while it is stored.

In step [S203], a Z value of the first span is stored, frame memory (FM) of the first span is stored, and painting information of the second span is generated. In the painting information generating section 20, comparison is made between a Z value obtained in the painting coordinate generating section 10 and a Z value stored in the second buffer 50 of the buffer section 30. When a newly generated Z value is on the viewpoint side, painting information including a Z value and color information to the frame memory (FM) is generated, and the information is stored in the second buffer 50 of the buffer section 30 as new painting information.

For example, as shown in FIG. 5A, the second buffer 50 stores 3-pixel color information, the corresponding byte enable information, and byte enable information corresponding to three pixels of a Z value such that only a single pixel in 32 bits and two pixels in 32 bits are painted. Additionally, the address generating section 60 generates an address for writing painting information of the first buffer 40 to the external memory section 70, based on address information of painting information previously stored in the first buffer 40, and the address generating section 60 writes painting information from the first buffer 40. Thus, the filling of the first span is completed.

In step [S204], a Z value of the 3-1 span is loaded. The painting coordinate generating section 10 generates an x coordinate and a y coordinate that conform to the left and right ends of the filling of the third span, and a Z value (depth coordinate) corresponding to the coordinates.

For example, FIG. 5B shows that the left end of an x coordinate is section 30, the right end of an x coordinate is 34, and a y coordinate is 3. Further, the address generating section 60 generates an address for reading a Z value corresponding to the region from the external memory section 70. Since the number of pixels is five at this moment, the address dividing section 90 divides an address and changes the number of processed pixels in the buffer to four, which is a limit number of the buffer. The address dividing section 90 requests data from the memory section with this address, the memory section 70 transfers a Z value corresponding to the data, and the read Z value is stored in the first buffer 40 of the buffer section 30. Further, address information at this moment is stored in the address generating section 60 to write painting information.

During this period, the painting information of the second buffer 50 waits for the end of loading a Z value of the 3-1 span while it is stored.

In step [S205], a Z value of the second span is stored, frame memory (FM) of the second span is stored, and painting information of the 3-1 span is generated. In the painting information generating section 20, comparison is made between a Z value obtained in the painting coordinate generating section 10 and a Z value stored in the first buffer 40 of the buffer section 30. When a newly generated Z value is on the viewpoint side, painting information including a Z value and color information to the frame memory (FM) is generated, and the information is stored in the first buffer 40 of the buffer section 30 as new painting information. Additionally, the address generating section 60 generates an address for writing painting information of the second buffer 50 to the external memory section 70, based on address information of painting information previously stored in the second buffer 50, and the address generating section 60 writes painting information from the second buffer 50. Thus, the filling of the second span is completed.

In step [S206], a Z value of the 3-2 span is loaded. The painting coordinate generating section 10 generates an x coordinate and a y coordinate that conform to the left and right ends of the filling of the 3-2 span, and a Z value (depth coordinate) corresponding to the coordinates. Moreover, the address generating section 60 generates an address for reading a Z value corresponding to the region from the external memory section 70. Additionally, since the number of remaining pixels is one at this moment, the address dividing section 90 does not divide an address but requests data from the memory section 70 with this address. The memory section 70 transfers a Z value corresponding to the data, and the read Z value is stored in the second buffer 50 of the buffer section 30.

Further, address information at this moment is stored in the address generating section 60 to write painting information.

During this period, the painting information of the first buffer 40 waits for the end of loading a Z value of the 3-2 span while it is stored.

And then, the steps [S203] to [S206] are repeated in the 3-2 span and later until the last y coordinate.

Therefore, as shown in FIG. 6, in the steps [S203] to [S205], while painting information to be written to the external memory section 70 is generated for the painting coordinate generating section 10, the painting information generating section 20, and one of the buffers of the buffer section 30 that stores information in advance, an address of previously generated painting information is generated in the address generating section 60, and data is written from the other buffer to the external memory section 70. The following operations are performed in parallel: generating painting information of the painting apparatus, writing generated data from the painting apparatus, and reading painting information required next time. Thus, it is possible to improve utilizing efficiency of the bus 82 connecting the memory section 70 and the buffer section 30, thereby increasing a painting speed. Moreover, the address dividing section 90 divides the number of pixels that cannot be handled together in the buffer section 30, thereby exchanging data with the external memory section 70.

(Embodiment 3)

FIGS. 7 to 11 show Embodiment 3 of the present invention.

Figure 7:
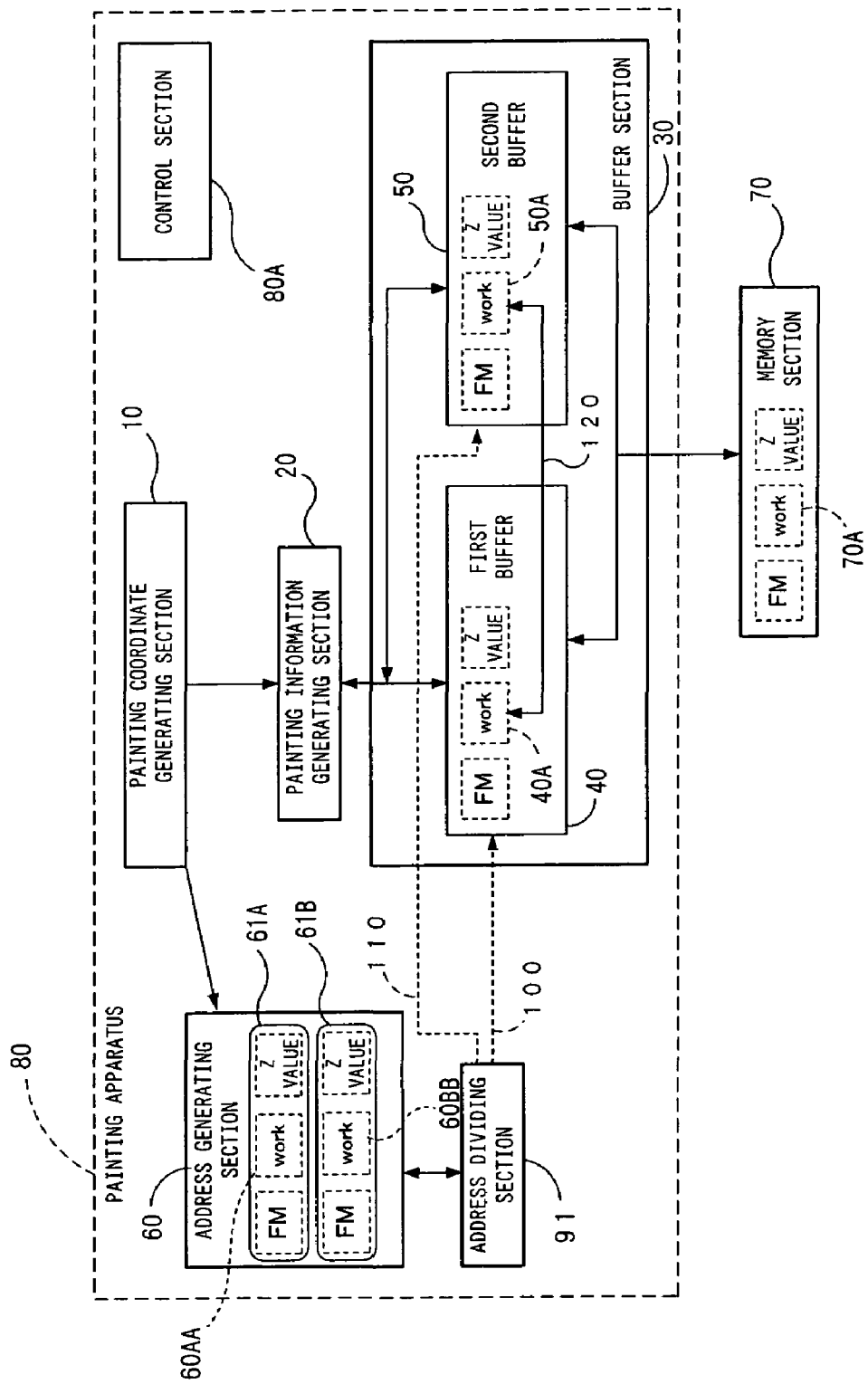
FIG. 7 is a structural diagram showing an apparatus for painting figures according to Embodiment 3 of the present invention.

FIG. 7 shows a painting apparatus according to Embodiment 3 of the present invention.

In the present embodiment, instructed painting processing is discriminated between "line processing" and "filling processing", and a control section 80A automatically changes the processing. FIGS. 8 and 9 show that the control section 80A performs line processing. FIGS. 10 and 11 show that the control section 80A performs filling processing.

First, the following will describe a difference in configuration between Embodiment 3 of FIG. 7 and the foregoing embodiments. Here, as for a Z value, since the same operations as Embodiment 2 are performed, the description thereof is omitted.

In a painting apparatus 80 of FIG. 7, a painting coordinate generating section 10 and a painting information generating section 20 are identical to those of Embodiment 2. A buffer section 30, an address generating section 60, and an address dividing section 91 are different in configuration from those of Embodiment 2.

A memory section 70 is different from Embodiment 2 in that a work region 70A is provided, in which a binary frame (hereinafter, referred to as "work") is written.

First and second buffers 40 and 50 of the buffer section 30 are different from those of Embodiment 2 in that binary frame registers (hereinafter, referred to as "work") 40A and 50A are provided.

The present embodiment is different from Embodiment 2 in that an address information storing section 61A of the address generating section 60 includes an address storing section 60AA and address information storing section 61B of the address generating section 60 includes an address storing section 60BB. The address storing section 60AA writes an address read from the work region 70A as an address corresponding to the content of the work register 40A, and the address storing section 60BB writes an address read from the work region 70A as an address corresponding to the content of the work register 50A.

An address dividing section 91 divides an amount of loading and storing at one time when an amount of data exceeds a single-time storable amount of the buffer section 30. The present embodiment is different from Embodiment 2 as follows: in addition to painting information and Z values, works are provided for indicating if painting information simultaneously handled is painted for each bit, the painting information is read once from the memory section 70, and then, a corresponding filling span is rewritten in the read data.

When the works are loaded in the buffer section 30, in the event of interference on data, loading of data from the other buffer is instructed.

Reference numerals 100 and 110 denote first and second reloading signals for transmitting the reloading of data from the address dividing section to the first buffer and the second buffer. Reference numeral 120 denotes a data exchange line for exchanging work data between the buffers (work register 40A and work register 50A).

First, referring to FIGS. 8 and 9, the following will discuss a case where the control section 80A judges line processing.

The present embodiment is different from Embodiment 1 in that since handled painting information is a one-bit work, which indicates whether painting is carried out, the painting information is read once from the memory section 70, and then only corresponding one-pixel data of read data is rewritten.

Figure 8A:
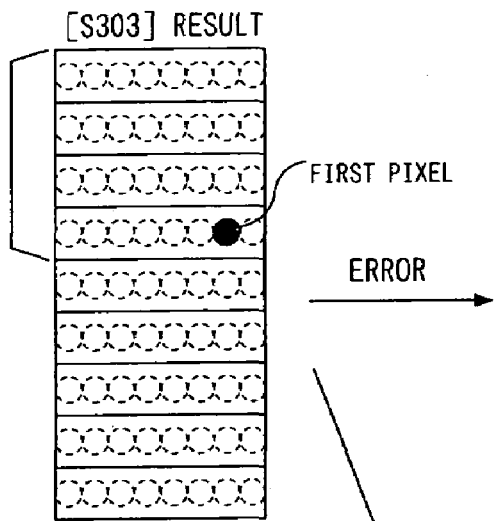
FIGS. 8A, 8B, 8C, and 8D are explanatory drawings showing line processing of Embodiment 3.
Figure 8B:
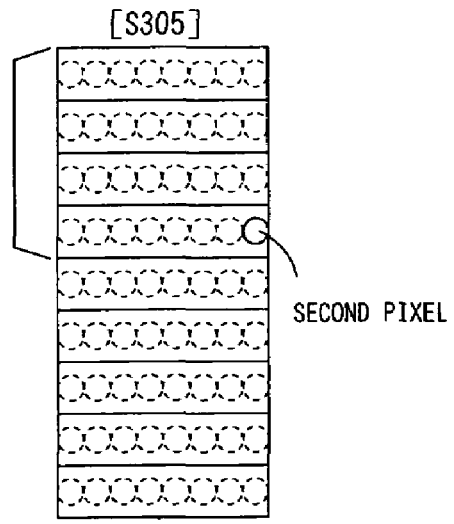
Figure 8C:
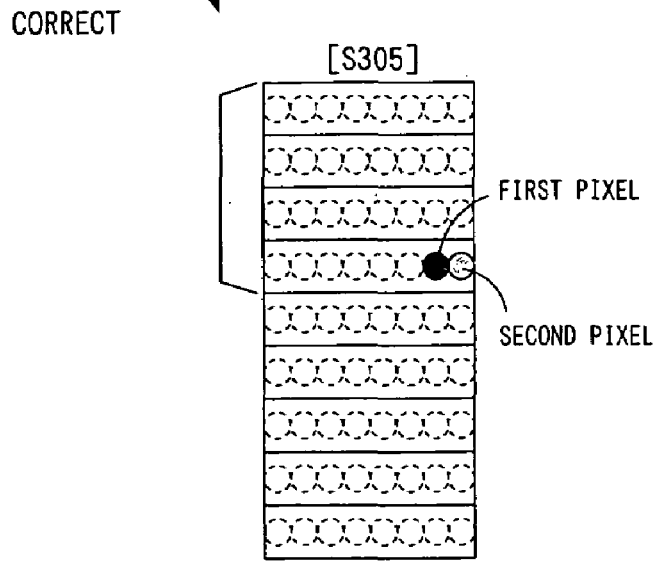
Figure 8D:
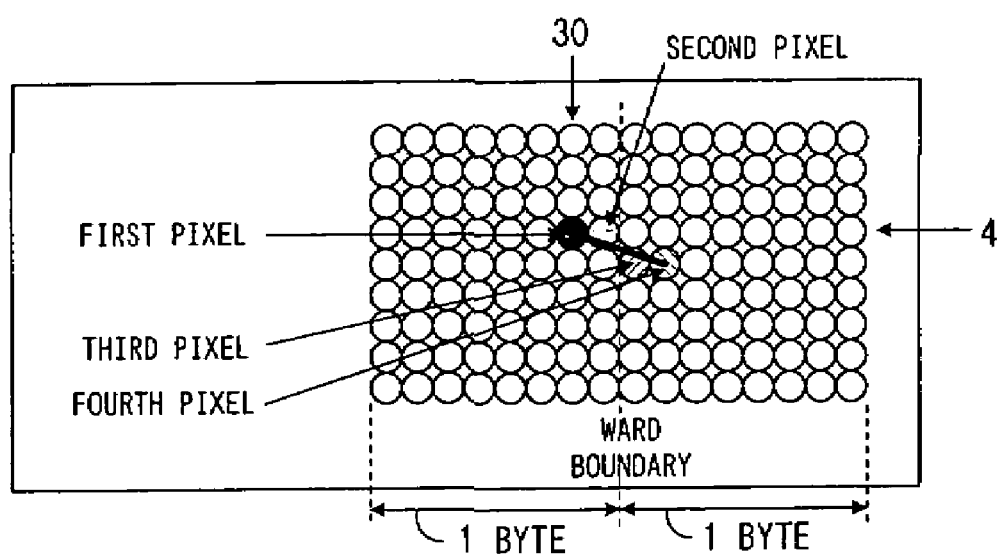
Figure 9:
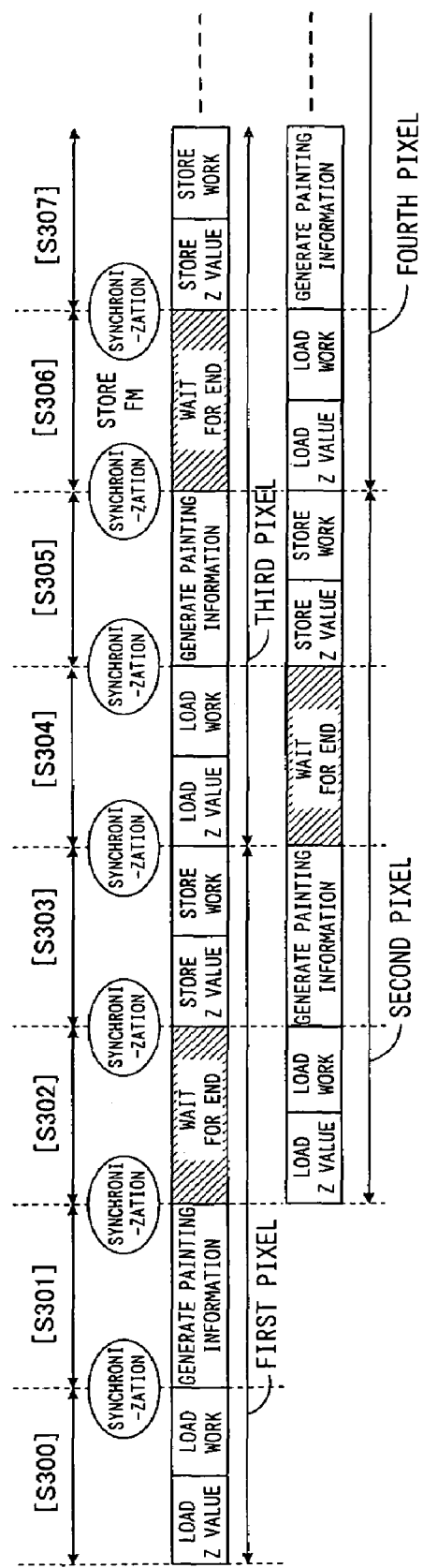
FIG. 9 is a diagram showing operating timings of line processing according to Embodiment 3.

FIGS. 8A, 8B, 8C, and 8D show an example in which painting processing is "line processing". FIGS. 8A, 8B, and 8C are memory maps showing the stored content of the memory section 70. FIG. 8D is an explanatory drawing showing a painting screen. FIG. 9 shows operating timings when the control section 80A of FIG.7 performs "line processing".

Here, the memory section 70 and the buffer section 30 are connected to each other via a bus having a width of 32 bits. The following will describe a painting operation in which color information stored in frame memory refers to a Z value (8 bits/pixel) of a line segment in work information of 1 bit/pixel.

In step [S300], a work and a Z value of the first pixel are loaded. The painting coordinate generating section 10 generates an x coordinate and a y coordinate of the first pixel, and a Z value (depth coordinate) corresponding to the coordinates.

For example, FIG. 8D shows that an x coordinate is 30 and a y coordinate is 4. Further, the address generating section 60 generates an address for reading a Z value and a work that correspond to the region from the external memory section 70, and stores the read work and Z value in the first buffer 40 of the buffer section 30. Moreover, address information at this moment is stored in the address generating section 60 to write painting information.

In step [S301], painting information of the first pixel is generated. In the painting information generating section 20, comparison is made between a Z value obtained in the painting coordinate generating section 10 and a Z value stored in the first buffer 40 of the buffer section 30. When a newly generated Z value is on the viewpoint side, painting information including a Z value and information to a work is generated, and the information is stored in the first buffer 40 of the buffer section 30 as new painting information.

For example, the first buffer 40 stores one-bit work information, byte enable information corresponding to the bit, 8-bit information corresponding to a single pixel of a Z value in 32 bits, and byte enable information corresponding to the pixel so as to paint only a single bit in 32 bits.

In step [S302], a Z value of the second pixel is loaded. The painting coordinate generating section 10 generates an x coordinate and a y coordinate of the second pixel, and a Z value (depth coordinate) corresponding to the coordinates.

For example, FIG. 8D shows that an x coordinate is 31 and a y coordinate is 4. Further, the address generating section 60 generates an address for reading a Z value corresponding to the region from the external memory section 70. The address dividing section 91 compares the previous first pixel and the present information and confirms that the information is one-pixel painting in the same byte and this data has not been stored in the external memory section 70 yet. Therefore, the first and second reloading signals 100 and 110 instruct to store the data from the first buffer 40 to the second buffer 50 via the data exchange line 120. In the second buffer 50 of the buffer section 30, work information is stored from the first buffer 40 and a Z value is stored from the memory section 70. Address information at this moment is stored in the address generating section 60 to write painting information.

During this period, the painting information of the first buffer 40 waits for the end of loading a Z value of the second pixel while it is stored.

In step [S303], work and a Z value of the first pixel are stored and painting information of the second pixel is generated. In the painting information generating section 20, comparison is made between a Z value obtained in the painting coordinate generating section 10 and a Z value stored in the second buffer 50 of the buffer section 30. When a newly generated Z value is on the viewpoint side, painting information including a Z value and work information is generated, and the information is stored in the second buffer 50 of the buffer section 30 as new painting information. FIG. 8A shows a result of step [S303].

For example, the second buffer 50 stores byte enable information corresponding to a single pixel in 8 bits and a Z value so as to paint only the pixel and Z value. Further, in the previous step [S303], when the address dividing section 91 does not instruct to load data from the buffer, an error of FIG. 8B appears as a painting result.

Also, the address generating section 60 generates an address for writing painting information of the first buffer 40 to the external memory section 70, based on address information of painting information previously stored in the first buffer 40, and the address generating section 60 writes painting information from the first buffer 40. Thus, the filling of the first pixel is completed.

In step [S304], a Z value of the third pixel is loaded. The painting coordinate generating section 10 generates an x coordinate and a y coordinate of the third pixel, and a Z value (depth coordinate) corresponding to the coordinates.

For example, FIG. 8D shows that an x coordinate is 32 and a y coordinate is 5. Further, the address generating section 60 compares addresses of the second pixel and the third pixel, confirms that the addresses are not on the same byte, generates an address for reading a Z value and work that correspond to the region from the external memory section 70 because it is not necessary to read work from the buffer, and stores the read Z value in the first buffer 40 of the buffer section 30. Moreover, address information at this moment is stored in the address generating section 60 to write painting information.

During this period, painting information of the second buffer 50 waits for the end of loading Z values of the third pixel while it is stored.

In step [S305], work and a Z value of the second pixel are stored and painting information of the third pixel is generated. In the painting information generating section 20, comparison is made between a Z value obtained in the painting coordinate generating section 10 and a Z value stored in the first buffer 40 of the buffer section 30. When a newly generated Z value is on the viewpoint side, painting information including work and color information to a Z value is generated, and the information is stored in the first buffer 40 of the buffer section 30 as new painting information. Also, the address generating section 60 generates an address for writing painting information of the second buffer 50 to the external memory section 70, based on address information of painting information previously stored in the second buffer 50, and the address generating section 60 writes painting information from the second buffer 50. As shown in a correct case of FIG. 8C, the filling of the second pixel is completed after the first pixel. If data is not exchanged between the buffers in step [S302], only the second pixel is painted as shown in an error of FIG. 8B.

In step [S306], a Z value of the fourth pixel is loaded. The painting coordinate generating section 10 generates an x coordinate and a y coordinate of the fourth pixel, and a Z value (depth coordinate) corresponding to the coordinates.

For example, FIG. 8D shows that an x coordinate is 33 and a y coordinate is 5. Further, in the address generating section 60, the third pixel and the present information are compared with each other. Since the information is single-bit information in the same byte and this data has not been stored in the external memory section 70, the first and second reloading signals 100 and 110 instruct to store the data from the other first buffer 40 to the second buffer 50 via the data exchange line 120. An address is generated for reading work information from the first buffer 40 and a Z value from the external memory section 70 into the buffer section 30. The read Z value is stored in the second buffer 50 of the buffer section 30. Further, address information at this moment is stored in the address generating section 60 to write painting information.

During this period, painting information of the first buffer 40 waits for the end of loading Z values of the fourth pixel while it is stored.

In step [S307], work and a Z value of the third pixel are stored and painting information of the fourth pixel is generated. In the painting information generating section 20, comparison is made between a Z value obtained in the painting coordinate generating section 10 and a Z value stored in the second buffer 50 of the buffer section 30. When a newly generated Z value is on the viewpoint side, painting information including work and color information to a Z value is generated, and the information is stored in the first buffer 40 of the buffer section 30 as new painting information. Also, the address generating section 60 generates an address for writing painting information of the first buffer, 40 to the external memory section 70, based on address information of painting information previously stored in the first buffer 40, and the address generating section 60 writes painting information from the first buffer 40. Thus, the filling of the third pixel is completed.

In step [S308], work and a Z value of the second pixel are stored. The address generating section 60 generates an address for writing painting information of the second buffer 50 to the external memory section 70, based on address information of painting information previously stored in the second buffer 50, and the address generating section 60 writes painting information from the second buffer 50. Thus, the filling of the fourth pixel is completed.

After the above steps [S301] to [S308], the line processing on a work is completed.

Therefore, as shown in FIG. 9, in steps [S303] to [S305], while painting information to be written to the external memory section 70 is generated for the painting coordinate generating section 10, the painting information generating section 20, and one of the buffers of the buffer section 30 that stores information in advance, the address generating section 60 generates an address of previously generated painting information, and work is written from the other buffer to the external memory section 70. The following operations are performed in parallel: generating painting information of the painting apparatus, writing generated work from the painting apparatus, and reading painting information required next time. Thus, it is possible to improve utilizing efficiency of the bus 82 connecting the memory section 70 and the buffer section 30, thereby increasing a painting speed.

Further, in the case where a read modify operation is necessary for painting in a work, on condition that painting is continuously performed in a byte, when work is read from the memory section 70, the address dividing section 91 exchanges data between the first buffer 40 and the second buffer 50 in the buffer section 30 via the data exchange line 120. Thus, it is possible to prevent an error in painting.

Figure 10D:
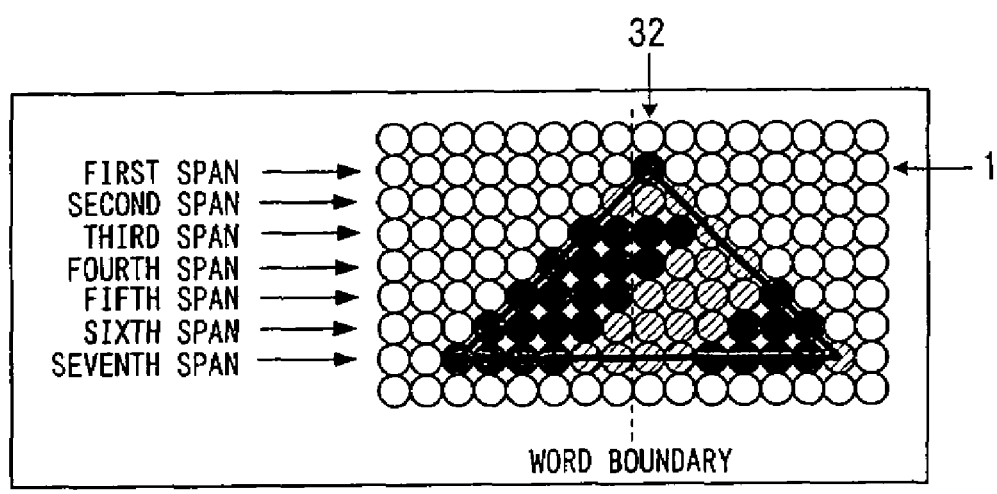
Figure 11:
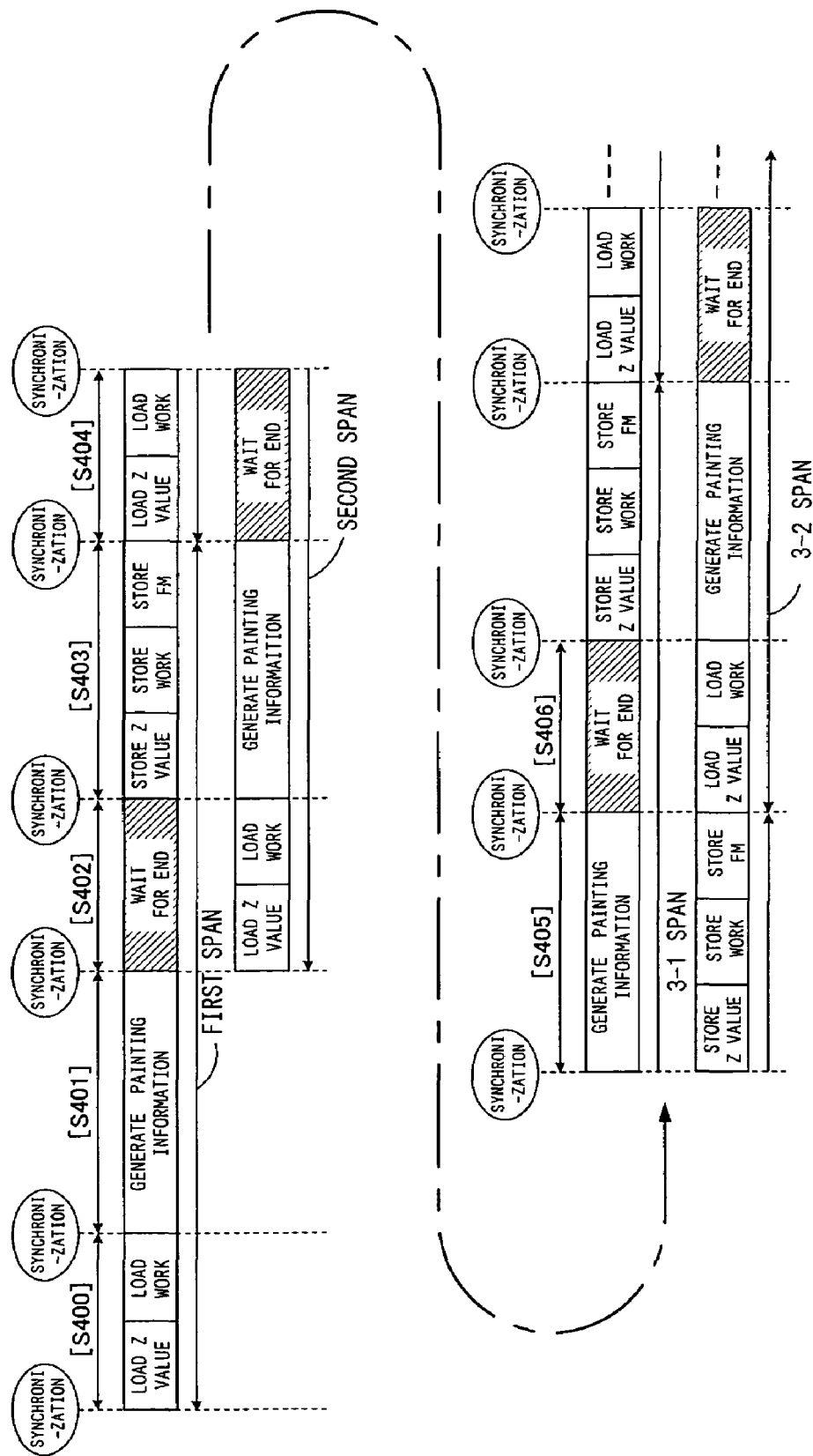
FIG. 11 is a diagram showing operating timings of a filling operation according to Embodiment 3.
Figure 12:
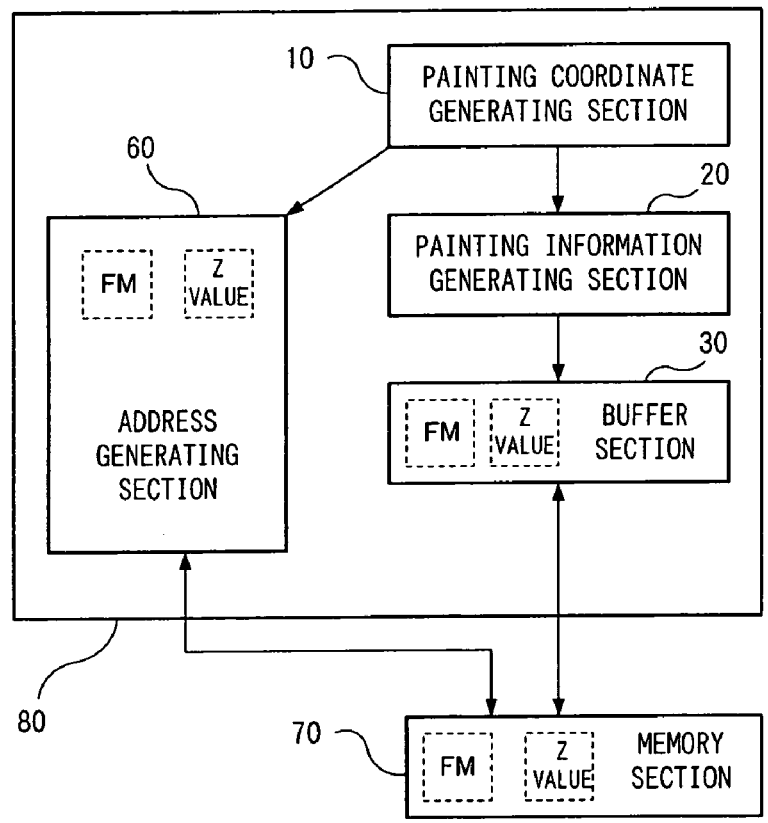
FIG. 12 is a structural diagram showing a conventional apparatus for painting figures.
Figure 13:
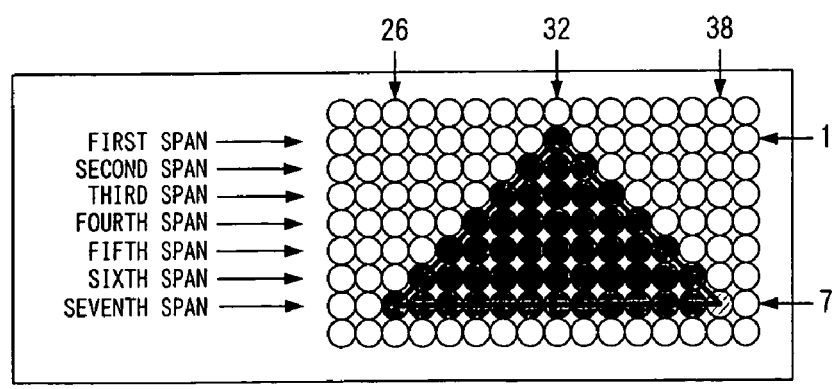
FIG. 13 is an explanatory drawing showing a painting operation of the conventional art.
Figure 14:
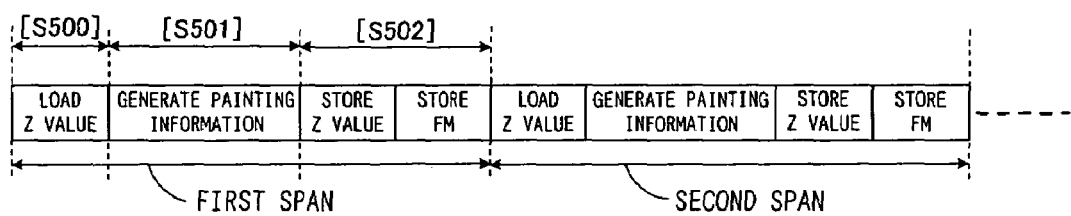
FIG. 14 is a diagram showing operating timings of the conventional art.

FIGS. 10A, 10B, 10C, and 10D show an example in which painting processing is "filling processing". FIGS. 10A, 10B, and 10C are memory maps showing the stored content of the memory section 70. FIG. 10D is an explanatory drawing showing a painting screen. FIG. 11 shows an operating timing when the control section 80A of FIG. 7 performs "filling processing".

Here, the memory section 70 and the buffer section 30 are connected to each other via a bus having a width of 32 bits. The following will describe a filling operation in which color information stored in frame memory refers to a Z value (8 bits/pixel) of filling in work information of 1 bit/pixel in addition to ordinary color information.

In step [S400], a Z value and work information of the first span are loaded. The painting coordinate generating section 10 generates an x coordinate and a y coordinate that conform to the left and right ends of the filling of the first span, and a Z value (depth coordinate) corresponding to the coordinates.

For example, FIG. 10D shows that the left end of an x coordinate is 32, the right end of an x coordinate is 32, and a y coordinate is 1. Further, the address generating section 60 generates an address for reading a Z value and work information that correspond to the region from the external memory section 70. Further, since the number of pixels is one at this moment, the address dividing section 91 does not divide the address but requests data from the memory section 70 by a span corresponding to the address, the memory section 70 transfers work information and a Z value that correspond to the span, and the read Z value is stored in the first buffer 40 of the buffer section 30.

Further, the address information at this moment is stored in the address generating section 60 to write painting information.

In step [S401], painting information of the first span is generated. In the painting information generating section 20, comparison is made between a Z value obtained from the painting coordinate generating section 10 and a Z value stored in the first buffer 40 of the buffer section 30. When a newly generated Z value is on the viewpoint side, painting information is generated on the Z value, frame memory (FM), and a work, and the information is stored as new painting information in the first buffer 40 of the buffer section 30.

For example, like Embodiment 2, the work information of the first buffer 40 stores 8-bit color information and byte enable information corresponding to the 8-bit information, 8 bits corresponding to a pixel of a Z value in 32 bits and byte enable information corresponding to the 8 bits, and information including rewritten single-pixel work information and the corresponding byte enable information such that painting is made only by a single pixel in 32 bits as shown in Embodiment 1.

In step [S402], a Z value and work information of the second span are loaded. The painting coordinate generating section 10 generates an x coordinate and a y coordinate that conform to the left and right ends of the filling of the second span, and a Z value (depth coordinate) corresponding to the coordinates.

For example, FIG. 10D shows that the left end of an x coordinate is 31, the right end of the x coordinate is 33, and a y coordinate is 2. Further, the address generating section 60 generates an address for reading a Z value and work information that correspond to the region from the external memory section 70. Further, since the number of pixels is three at this moment, the address dividing section 91 does not divide the address but requests data from the memory section 70 with this address, the memory section 70 transfers a corresponding Z value and the corresponding work information, and the read Z value and the work information are stored in the second buffer 50 of the buffer section 30.

Further, the address information at this moment is stored in the address generating section 60 to write painting information.

During this period, the painting information of the first buffer 40 waits for the end of loading a Z value of the second span while it is stored.

In step [S403], a Z value, frame memory (FM), and work information of the first span are stored, and painting information of the second span is generated. In the painting information generating section 20, comparison is made between a Z value obtained in the painting coordinate generating section 10 and a Z value stored in the second buffer 50 of the buffer section 30. When a newly generated Z value is on the viewpoint side, painting information including a Z value, the frame memory (FM), and color information to the work information is generated, and the information is stored in the second buffer 50 of the buffer section 30 as new painting information.

For example, as shown in FIG. 10, the second buffer 50 stores 3-pixel color information, the corresponding byte enable information, and byte enable information corresponding to three pixels of Z values, information including work information rewritten by three pixels, and the corresponding byte enable information so as to paint only a single pixel in 32 bits and two pixels in 32 bits like Embodiment 2.

Additionally, the address generating section 60 generates an address for writing painting information of the first buffer 40 to the external memory section 70, based on address information of painting information previously stored in the first buffer 40, and the address generating section 60 writes painting information from the first buffer 40. Thus, the filling of the first span is completed.

In step [S404], a Z value and work information of the 3-1 span are loaded.

The painting coordinate generating section 10 generates an x coordinate and a y coordinate that conform to the left and right ends of the filling of the third span, and a Z value (depth coordinate) corresponding to the coordinates.

For example, FIG. 10D shows that the left end of an x coordinate is 30, the right end of an x coordinate is 34, and a y coordinate is 3. Further, the address generating section 60 generates an address for reading a Z value corresponding to the region from the external memory section 70. Since the number of pixels is five at this moment, the address dividing section 91 divides the address, changes the number of processed pixels of the buffer to four, which is a limit number of the buffer, requests data from the memory section 70 with this address, the memory section 70 transfers the corresponding Z value, and the read Z value is stored in the first buffer 40 of the buffer section 30. Further, address information at this moment is stored in the address generating section 60 to write painting information.

During this period, the painting information of the second buffer 50 waits for the end of loading a Z value of the third span while it is stored.

In step [S405], a Z value, frame memory (FM), and work information of the second span are stored, and painting information of the 3-1 span is generated. In the painting information generating section 20, comparison is made between a Z value obtained in the painting coordinate generating section 10 and a Z value stored in the first buffer 40 of the buffer section 30. When a newly generated Z value is on the viewpoint side, painting information including a Z value, the frame memory (FM), and color information to the work information is generated, and the information is stored in the first buffer 40 of the buffer section 30 as new painting information.

Additionally, the address generating section 60 generates an address for writing painting information of the second buffer 50 to the external memory section 70, based on address information of painting information previously stored in the second buffer 50, and the address generating section 60 writes painting information from the second buffer 50. Thus, the filling of the second span is completed.

In step [S406], a Z value and work information of the 3-2 span are loaded. The painting coordinate generating section 10 generates an x coordinate and a y coordinate that conform to the left and right ends of the filling of the 3-2 span, and a Z value (depth coordinate) corresponding to the coordinates. The address generating section 60 generates an address for reading a Z value corresponding to the region from the external memory section 70. Further, since the number of remaining pixels is one at this moment, the address dividing section 91 does not divide the address but requests data from the memory section 70 with this address. Regarding work information, the painting is partly completed in the same byte in step [S405]. Therefore, the first and second reloading signals 100 and 110 instruct to store the data from the other second buffer 50 to the first buffer 40 via the data exchange line 120. Work information of the first byte is stored from the second buffer 50, work information of the second byte and later is stored from the external memory section 70, and a Z value is stored from the external memory section 70, in the first buffer 40 of the buffer section 30.

In this case, work information is taken from the other buffer. Thus, for example, as shown in the correct case of FIG. 10C, the filling of the 3-2 span is completed after the 3-1 span. In the case where data is not exchanged between the buffers, as shown in the error of FIG. 10B, the painting result only includes two pixels of the 3-1 span and a single pixel of the 3-2 span.

Further, the address information at this moment is stored in the address generating section 60 to write painting information.

During this period, the painting information of the first buffer 40 waits for the end of loading a Z value of the 3-2 span while it is stored.

And then, the steps [S403] to [S406] are repeated until the last y coordinate.

Therefore, in the steps [S403] to [S405], while painting information to be written in the external memory section 70 is generated for the painting coordinate generating section 10, the painting information generating section 20, and one of the buffers of the buffer section 30 that stores information in advance, the address generating section 60 generates an address for previously generated painting information, and data is written to the external memory section 70 from the other buffer. The following operations are performed in parallel: generating painting information of the painting apparatus, writing data previously generated in the painting apparatus, and reading painting information required next time. Therefore, it is possible to increase the utilizing efficiency of the bus 82 for connecting the memory section 70 and the buffer section 30, thereby improving a painting speed. Further, since the address dividing section 91 divides the number of pixels that cannot be handled at one time in the buffer section 30, exchanges are possible with the external memory section.

Besides, Japanese Patent Laid-Open No. 11-66341 discloses a method by which graphics are divided into an odd-numbered span and an even-numbered span, a plurality of painting sections are used to perform painting operations in parallel, synchronization is made by frame memory to display an image. In the case of the above method, a plurality of painting sections are necessary for high-speed painting. Meanwhile, the painting apparatus of the present invention is different in that the painting capability can be improved by increasing efficiency of access between the painting section and the memory section without the necessity for a plurality of painting sections.

What is claimed is:

1. An apparatus for paint processing an image, comprising:

a painting coordinate generating section for generating a painting coordinate for paint processing an image, a painting information generating section for generating painting information for a region generated from the painting coordinate generating section;

a buffer section having only two buffers for storing painting information generated in the painting information generating section;

an external memory section; and an address generating section for generating an address for storing painting information to the external memory section, wherein the address generating section includes address information storing sections corresponding to the two buffers of the buffer section, wherein the painting information generating section is for writing data to and reading data from a first of the two buffers and the buffer section is for outputting data from a second of the two buffers to the external memory section, said writing and reading data and said outputting data being performed in parallel, wherein said buffer section is for outputting data comprising data written during a previous processing to the external memory section, and inputting data for next processing from the external memory section, wherein each buffer comprises a capacity and a filling amount, and the address generating section is for comparing the capacity with the filling amount, and the apparatus further comprises at least one address dividing section for dividing a filling operation for the memory section when the filling amount exceeds the capacity of each buffer by filling each buffer to said capacity and deferring any overflow data for said next processing, wherein the address dividing section is for performing a dividing operation when the address generating section, the painting information generating section, and the buffer section generate painting information, and is for determining any data interference by referring to previous results of said dividing operation, said data interference occurring at the time of the dividing operation when data stored in an address of the external memory is divided and outputted into two buffers, and further comprising a data load line for loading in one of the two buffers part of data of said determined data interference which has been previously processed and stored in the other of the two buffers for the next processing, wherein the painting information generation section is for processing such loaded data along with data stored in said one buffer.

2. The apparatus for paint processing an image according to claim 1, wherein the at least one address dividing section is for determining if data in the memory section is subject to plural simultaneous accesses, thereby determining occurrence of data interference, in a case of painting line segments.

3. The apparatus for paint processing an image according to claim 1, wherein the at least one address dividing section is for determining if previously rewritten data in the memory section is subject to plural simultaneous accesses, thereby determining occurrence of data interference in a case of filling processing.

4. The apparatus for paint processing an image according to claim 1, wherein said external memory section comprises RAM.

5. The apparatus for paint processing an image according to claim 1, further comprising a bus connected between the buffer section and the external memory section, wherein said bus is for (1) outputting data comprising data written during a previous processing to said buffer other than said one buffer to the external memory section and (2) inputting data from the external memory section.

* * * * *